Patented July 26, 1927.

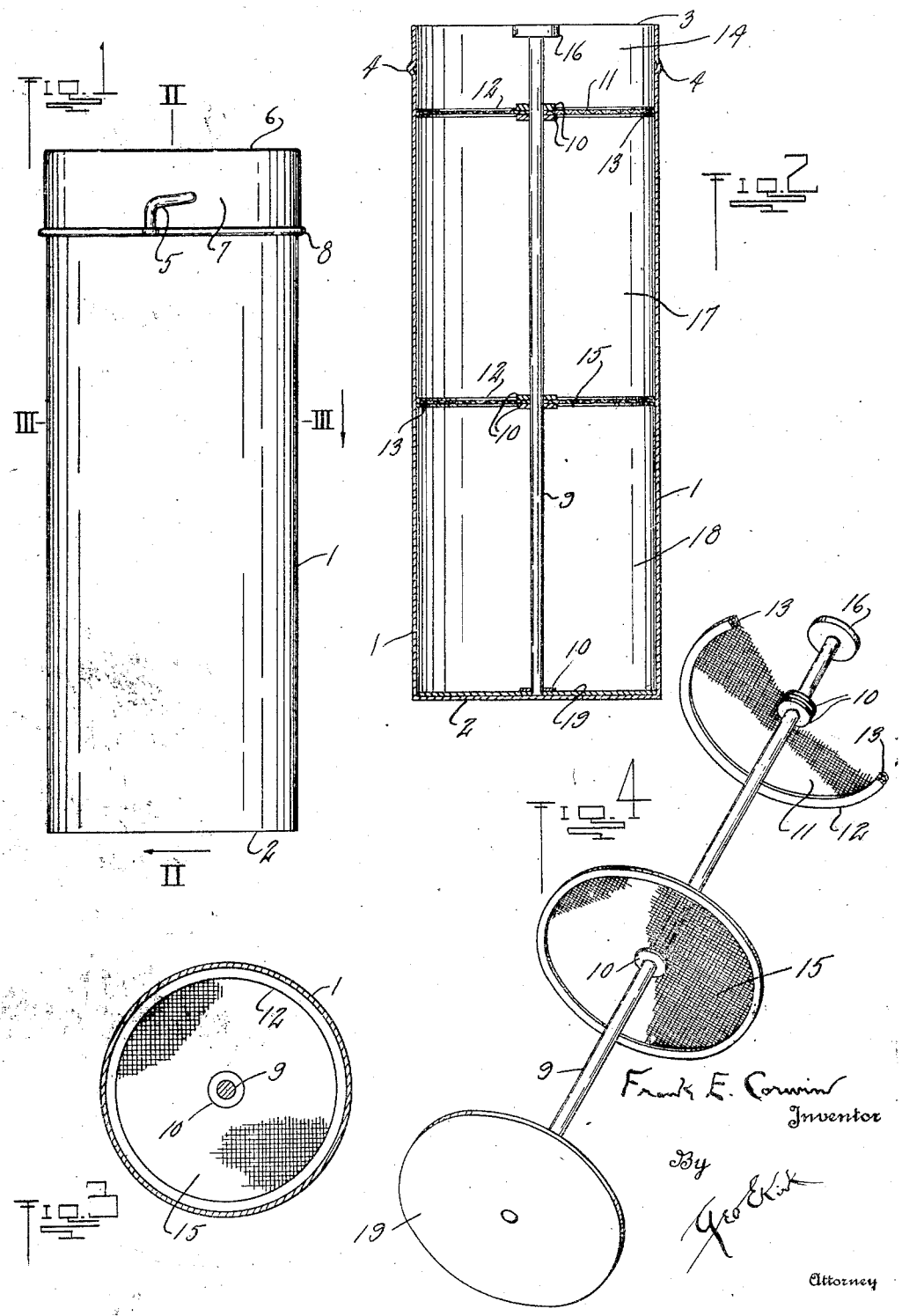

1,637,103

UNITED STATES PATENT OFFICE.

FRANK E. CORWIN, OF TOLEDO, OHIO.

EGG BEATER.

Application filed September 20, 1926. Serial No. 136,524.

This invention relates to entraining gas in liquid or semi-liquid food stuffs.

This invention has utility when incorporated in an egg beater, cream or icing whipper or agitator.

Referring to the drawings:

Fig. 1 is a side elevation of an embodiment of the device in a canister or cylindrical vessel as adapted for shaking, whipping, or agitating purposes;

Fig. 2 is a vertical section through the vessel of Fig. 1, with the cover or closure removed, on the line II—II, of Fig. 1;

Fig. 3 is a section on the line III—III, Fig. 1; and

Fig. 4 is a perspective view, with parts broken away, of the diaphragm and disk carrying stem as removed from the vessel of Fig. 1.

The vessel is shown as having cylindrical side wall 1 rising from flat bottom 2. This side wall 1 upwardly terminates at opening 3, adjacent which and diametrically disposed, is a pair of outwardly projecting offsets 4 for coacting with inwardly facing grooves 5 and providing bayonet joint assembly of cover having end wall 6 and side wall 7. This end wall 6 is flat to oppose the end wall 2 of the cylindrical vessel or receiver. The side wall 7 of the closure is cylindrical to envelop a portion of the wall 1 adjacent the opening 3. This side wall 7 of the closure terminates in a bead 8 giving such stiffness for retaining its contour and thus making the device one for more readily assembling.

Coaxially disposed in this vessel 1, 2, is stem 9 extending through a pair of bushings 10, as clamping therebetween foraminous diaphragm or screen 11 peripherally embraced by binding circular rim 12 providing clamping channel 13 for embracing the wire cloth or foraminous diaphragm 11. These washers 10 are fixed with the stem 9 in a region spaced but a short distance from the opening 3. The convenience of the spacing arises in the instance the structure is used for beating the whites of eggs, in that the egg may be broken directly into chamber 14, as a receiving section between the diaphragm 11 and the opening 3. This diaphragm 11 thus allows the white of the egg to pass through, while the yolk, as unbroken, is retained thereon and may be spilled out into another vessel. This diaphragm 11 thus serves as a classifier.

About mid-way between the diaphragm 11 and the bottom 2 of the cylindrical vessel, the stem 9 has fixed thereon a second foraminous diaphragm 15 anchored by washers 10 to the stem 9 and peripherally bound by channel member 12. This diaphragm 15, like the diaphragm 11, in practice, upon rapid shifting of this vessel axially, serves as an interceptor through which the more or less liquid material may tend to and partially pass. The material is thus sub-divided and tends to take into itself the air within the vessel and thus foams or forms bubbles in effecting the beating or agitation of the material.

In the event the substance being handled be white of an egg, and it is desired to incorporate some sugar therewith, handle 16 on the stem 9, as just within the wall 6 of the closure, may be, upon removal of the closure, pulled outward to have the diaphragm 11 provide slight clearance as to the opening 3 so that such material may be introduced upon the diaphragm 15 in chamber section 17. Repositioning of this stem with its diaphragms in the vessel and reapplication of the closure leaves this device in condition for further carrying on of the shaking, or rapid axial shiftings thereof to cause the material, not only to impact the interceptors or diaphragms 11, 15, but some of such materials work through the chamber section 17 into chamber section 18. Accordingly, both sides of each of the interceptors 11, 15, co-operate in this shifting, agitating or beating sub-division of the material in quickly foaming such up to the desired consistency or body. As the operation is carried on to the desired extent or completed, the closure may be removed from the vessel, then the handle 16 grasped or engaged and the stem 9 pulled axially of the vessel. This stem 9 has fixed therewith by washer 10, remote from the handle 16, disk 19 approximating the internal diameter of the wall 1 so that as this stem 9 is pulled axially from the vessel, this disk 19 serves as a device for clearing the vessel of the material being treated. The material is thus readily all withdrawn from the vessel for the gathering or discharge in the place as desired.

In the event the device be used for handling other materials in which it is desired to retain a certain portion in the vessel instead of discharging therefrom, as in certain crushes as seeds, or pits, such may be retained by the diaphragm or interceptor 15 according to the place where the material may have been originally charged.

This device is of simple construction which may be in its operation very rapidly effective in bringing about a desired agitated or beaten condition of the material, a preferable proportion being a three inch diameter for the vessel 1 and having such approximately eight inches long. The device is one sanitary in its general construction and readily cared for as to cleansing.

What is claimed and it is desired to secure by United States Letters Patent is:—

1. A vessel having a receiving section, an agitation section, and a classifier diaphragm therebetween, said agitation section including intermediate its extent a foraminous interceptor.

2. An agitation vessel comprising intermediate its extent a vessel interior clearing element and a concentric foraminous interceptor, a stem mounting said interceptor and element for removal therewith.

3. A cylindrical egg beater vessel, having a terminal opening, a concentric stem in the vessel having a handle adjacent the opening, a classifier foraminous interceptor adjacent the handle and opening and mounted on the stem, a foraminous intercepter spaced from the classifier interceptor and also mounted on the stem, and a disk terminally carried by the stem against the end of the vessel remote from the opening effective with removal of the interceptors and stem to clear the vessel interior of accumulation of the material being agitated, and a quick detachable closure for the vessel opening.

In witness whereof I affix my signature.

FRANK E. CORWIN.